(12) United States Patent
Chiproot

(10) Patent No.: US 11,480,278 B2
(45) Date of Patent: Oct. 25, 2022

(54) GRIP ELEMENTS FOR PIPES

(71) Applicant: Krausz Industries Ltd., Rosh HaAyin (IL)

(72) Inventor: Avi Chiproot, Kfar-Saba (IL)

(73) Assignee: Krausz Industries Ltd., Rosh HaAyin (IL)

( * ) Notice: Subject to any disclaimer, the term of this patent is extended or adjusted under 35 U.S.C. 154(b) by 137 days.

(21) Appl. No.: 17/117,441

(22) Filed: Dec. 10, 2020

(65) Prior Publication Data

US 2022/0186868 A1 Jun. 16, 2022

(51) Int. Cl.
*F16L 37/091* (2006.01)

(52) U.S. Cl.
CPC .................................. *F16L 37/091* (2013.01)

(58) Field of Classification Search
CPC ......... F16L 25/01; F16L 25/06; F16L 25/065; F16L 25/08; F16L 37/0842; F16L 37/086; F16L 37/091; F16L 37/0925; F16L 37/18

USPC .... 285/40, 92, 314, 315, 317, 394, 403, 321
See application file for complete search history.

(56) References Cited

U.S. PATENT DOCUMENTS

2011/0291409 A1* 12/2011 Kennedy, Jr. ......... F16L 25/065
285/421

\* cited by examiner

*Primary Examiner* — Aaron M Dunwoody
(74) *Attorney, Agent, or Firm* — David Klein

(57) ABSTRACT

An accessory for a clamp assembly includes a grip element which has a base portion including two opposite end faces, rows of teeth that protrude from the base portion, the teeth being arranged in rows with gaps separating them, wherein each of the teeth has a shape as viewed from one of the end faces which includes a first shape portion which has straight sides each of which extends from the base portion to an end, wherein a junction of each of the straight sides with the base portion has a radius, wherein the straight sides form borders of the gaps. Each of the teeth includes another shape portion that extends inwards, away from the gaps. The ends of the straight sides of the first shape portion and the other shape portion cooperate to grip a pipe.

4 Claims, 1 Drawing Sheet

GRIP ELEMENTS FOR PIPES

FIELD OF THE INVENTION

The present invention relates generally to clamps and couplings for pipes, and particularly to grip elements used in clamps and couplings for gripping plastic or metal pipes, or any other materials.

BACKGROUND OF THE INVENTION

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, plastic including polyolefins and PVC.

The wide variety of pipe materials presents a challenge for providing a reliable seal for use with pipe couplings and clamps. Some seals are suitable for soft materials, but not suitable for hard materials, and vice versa.

SUMMARY OF THE INVENTION

The present invention seeks to provide improved grip elements for use with pipe couplings and clamps (e.g., in grip rings and other applications). The terms "clamp" and "coupling" are used interchangeably. In a non-limiting embodiment the present invention, the grip elements have rows of elongate teeth with a unique cross-sectional shape that is able to bite into both soft and hard materials, and as such, is suitable for a wide variety of pipe materials.

There is provided in accordance with a non-limiting embodiment an accessory for a clamp assembly including a grip element which has a base portion including two opposite end faces, rows of teeth that protrude from the base portion, the teeth being arranged in rows with gaps separating them, wherein each of the teeth has a shape as viewed from one of the end faces which includes a first shape portion which has straight sides each of which extends from the base portion to an end, wherein a junction of each of the straight sides with the base portion has a radius, wherein the straight sides form borders of the gaps, and wherein each of the teeth includes another shape portion that extends inwards, away from the gaps, and the ends of the straight sides of the first shape portion and the other shape portion are adapted to act in cooperation to grip a pipe.

In a non-limiting embodiment the present invention, the other shape portion includes a second shape portion that extends perpendicularly inwards from the ends to a third shape portion which is triangular and which has an apex that points away from the base portion. The apex may be sharp. The corners of the grip element may be rounded.

The base portion may be curved and form at least a portion of a ring.

In a non-limiting embodiment the present invention, the other shape portion includes a second shape portion which is a concave hollow portion with a radius which joins the straight sides of the first shape portion at the edges.

In a non-limiting embodiment the present invention, the other shape portion includes a second shape portion which is a semi-trapezoidal shape that has a flat central portion between two opposing triangular protruding portions, each of which joins the straight sides of the first shape portion at the edges.

BRIEF DESCRIPTION OF THE DRAWINGS

The present invention will be understood and appreciated more fully from the following detailed description, taken in conjunction with the drawing in which.

DETAILED DESCRIPTION

Figure 1:
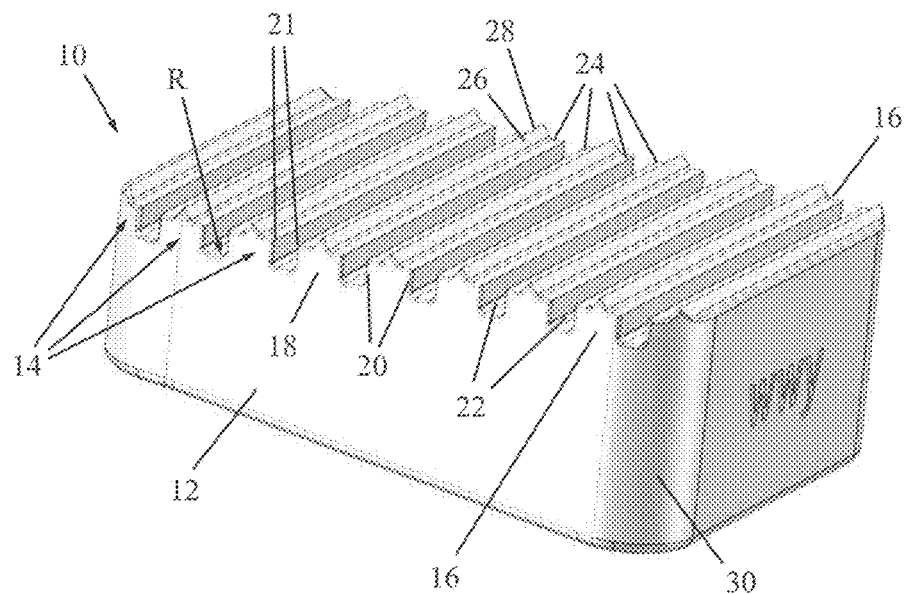
FIG. 1 is a simplified pictorial illustration of a grip element, constructed and operative in accordance with a non-limiting embodiment of the present invention.

Reference is now made to FIG. 1, which illustrates a grip element 10, constructed and operative in accordance with a non-limiting embodiment of the present invention.

Grip element 10 has a base portion 12 from which rows of elongate teeth 14 protrude. Grip element 10 may be made of any suitable material for gripping against pipes, such as but not limited to, an elastomer, such as natural or synthetic rubber, e.g., EPDM (ethylene propylene diene monomer) or neoprene, or other materials, such as metals or plastics, depending on the application.

Base portion 12 may be part of a ring-shaped grip, in which case base portion 12 is curved and may form part of a full ring or may be a full ring. Alternatively, base portion 12 may be part of a linear grip, in which case base portion 12 is straight. Base portion 12 has two opposite end faces 16.

Each tooth 14 has a cross-sectional shape (that is, the shape as viewed from one of the end faces 16; the length of each tooth is the length between the end faces 16) which includes a first shape portion 18. Each first shape portion 18 has straight sides 20 that extend from base portion 12 to ends 21 (the end furthest from the base portion 12). The junction of each straight side 20 with base portion 12 may be round with a radius R. In other embodiments, the junction of each straight side 20 with base portion 12 may be sharp (i.e., R=0). The teeth 14 are arranged in rows with gaps 22 separating them. Thus, the straight sides 20 are also the borders of gaps 22.

A second shape portion 24 extends perpendicularly inwards from the ends 21, that is, away from the gaps 22, up to a third shape portion 26 which is triangular and has an apex 28 that points away from base portion 12. The triangular shape may be that of a regular triangle (e.g., isosceles) or irregular triangle, and may have straight or non-straight sides. Apex 28 may be sharp or rounded. In either way, apex 28 is adapted to bite into a pipe and create a tenacious hold for the grip element 10 on the pipe. Depending on the material, apex 28 may bend over and the second shape portion 24 and third shape portion 26 jam against the pipe to hold the grip element in place by means of increased friction.

The corners 30 of grip element 10 may be rounded, or alternatively, non-rounded.

Figure 2:
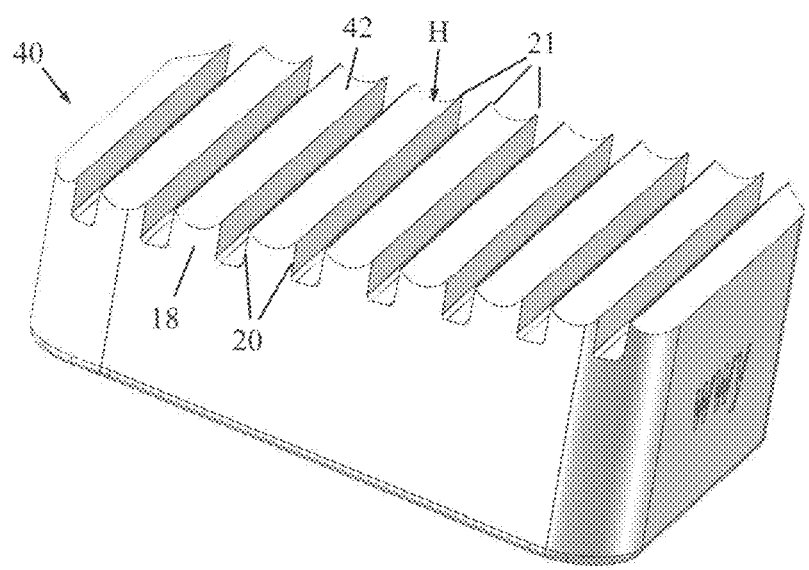
FIG. 2 is a simplified pictorial illustration of a grip element, constructed and operative in accordance with another non-limiting embodiment of the present invention.

Reference is now made to FIG. 2, which illustrates a grip element 40, constructed and operative in accordance with a non-limiting embodiment of the present invention.

Grip element 40 is similar to grip element 10 and common elements are designated by common numerals.

Grip element 40 differs from grip element 10 in that grip element 40 has different second shape portions. Grip element 40 includes a second shape portion 42 which is a concave hollow portion with a radius H. The second shape portion 42 joins the straight sides 20 of first shape portion 18 at edges 21, which may be sharp or rounded. The radius H can be selected to increase or decrease the bite of grip element 40 into the pipe, depending upon the materials of the pipe.

Figure 3:
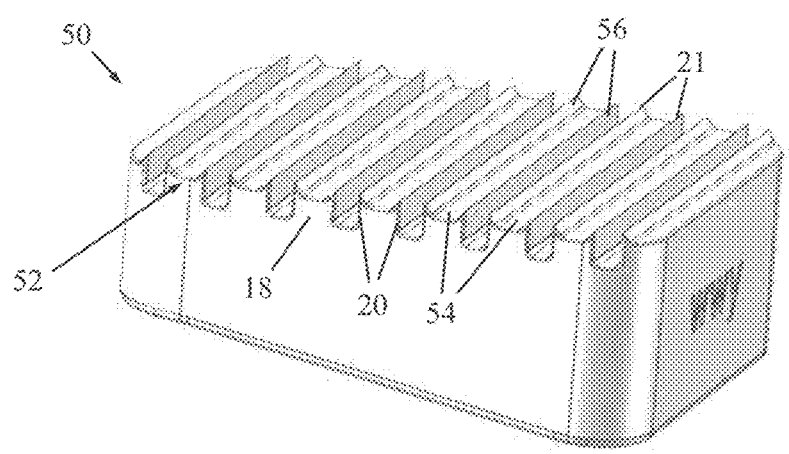
FIG. 3 is a simplified pictorial illustration of a grip element, constructed and operative in accordance with yet another non-limiting embodiment of the present invention.

Reference is now made to FIG. 3, which illustrates a grip element 50, constructed and operative in accordance with a non-limiting embodiment of the present invention.

Grip element 50 is similar to grip element 40 and common elements are designated by common numerals.

Grip element 50 differs from grip element 40 in that grip element 50 has different second shape portions. Grip element 50 includes a second shape portion 52 which is a semi-trapezoidal shape that has a flat central portion 54 between two opposing triangular protruding portions 56, each of which joins the straight sides 20 of first shape portion 18 at edges 21, which may be sharp or rounded. The shape of edges 21 can be selected to increase or decrease the bite of grip element 50 into the pipe or friction against the pipe, depending upon the materials of the pipe.

Depending on the material, triangular protruding portions 56 may bend over and jam against the pipe to hold the grip element in place with increased friction.

What is claimed is:

1. An article comprising:
   an accessory for a clamp assembly comprising a grip element which has a base portion comprising two opposite end faces;
   rows of teeth that protrude from said base portion, said teeth being arranged in rows with gaps separating them, wherein each of said teeth has a shape as viewed from one of said end faces which includes a first shape portion which has straight sides each of which extends from said base portion to an end, wherein a junction of each of said straight sides with said base portion has a radius, wherein said straight sides form borders of said gaps; and
   wherein each of said teeth comprises another shape portion that extends inwards, away from said gaps, wherein said ends of said straight sides of said first shape portion and said other shape portion are adapted to act in cooperation to grip a pipe;
   wherein said other shape portion comprises a second shape portion that extends perpendicularly inwards from said ends to a third shape portion which is triangular and which has an apex that points away from said base portion, and wherein said apex is sharp.

2. The article according to claim 1, wherein corners of said grip element are rounded.

3. The article according to claim 1, wherein said base portion is curved and forms at least a portion of a ring.

4. An article comprising:
   an accessory for a clamp assembly comprising a grip element which has a base portion comprising two opposite end faces;
   rows of teeth that protrude from said base portion, said teeth being arranged in rows with gaps separating them, wherein each of said teeth has a shape as viewed from one of said end faces which includes a first shape portion which has straight sides each of which extends from said base portion to an end, wherein a junction of each of said straight sides with said base portion has a radius, wherein said straight sides from borders of said gap; and
wherein each of said teeth comprises another shape portion that extends inwards, away from said gaps, wherein said ends of said straight sides of said first shape portion and said other shape portion are adapted to act in cooperation to grip a pipe, wherein said other shape portion comprises a second shape portion which is a semi-trapezoidal shape that has a flat central portion between two opposing triangular protruding portions, each of which joins said straight sides of said first shape portion at said edges.

* * * * *